April 10, 1928.
W. MIDGLEY
LEVELING SQUARE
Filed Dec. 21, 1925
1,665,504
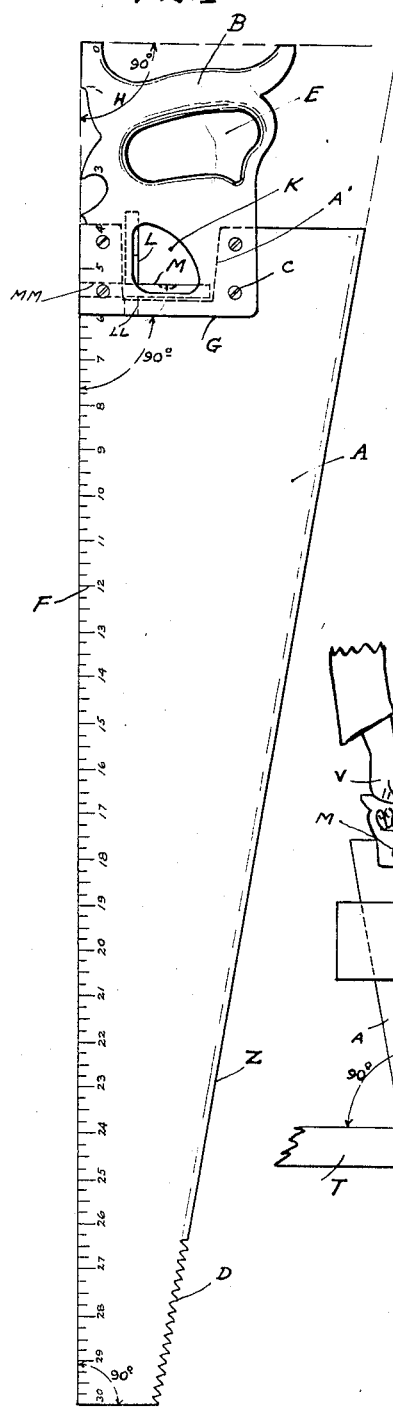
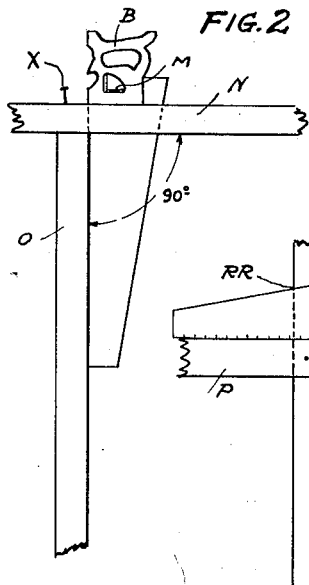
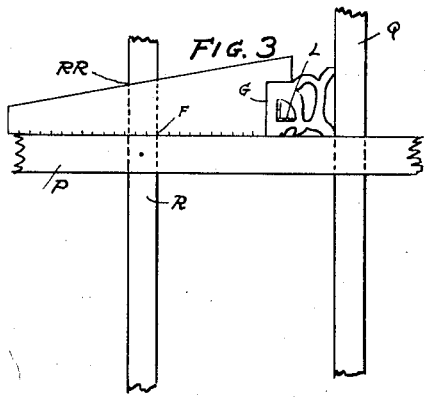
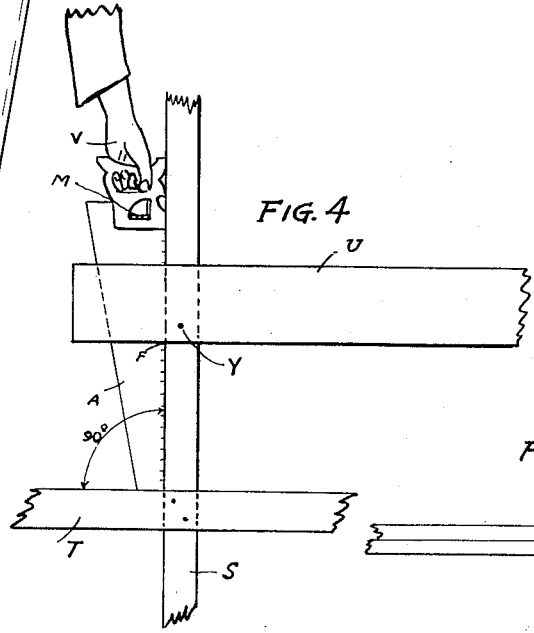
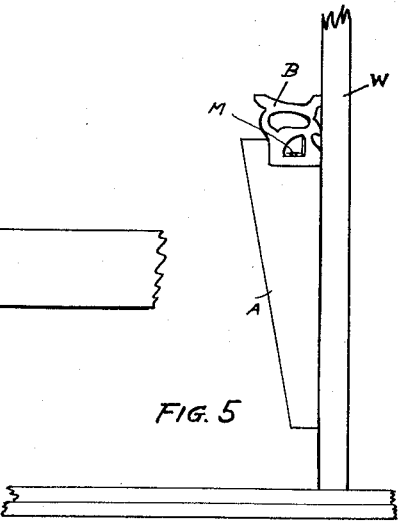
INVENTOR.
WILLIAM MIDGLEY.
BY *Julien A. Bried*
HIS ATTORNEY.

Patented Apr. 10, 1928.

1,665,504

UNITED STATES PATENT OFFICE.

WILLIAM MIDGLEY, OF BERKELEY, CALIFORNIA.

LEVELING SQUARE.

Application filed December 21, 1925. Serial No. 76,837.

My invention relates to mechanic's hand tools as used for squaring and leveling construction work.

The objects of the invention are to provide a tool of this character which will be better adapted to perform the required functions, as may be necessary in construction work, than are the tools devised before the needs of modern efficiency methods of construction were known.

My tool is essentially a leveling square, inasmuch as it squares, levels, and plumbs work with one setting, provides for the squaring and leveling of work ordinarily out of reach of the workman, and all with an expediency never equaled in prior tools so far as I am aware. The tool is accurate, light, cheap, and compact, and also provides for measuring and cutting the stock before or after erection to bring it to the required squared and leveled condition.

In the drawings accompanying this application the preferred embodiment of my invention is shown, Fig. 1 being a side elevation of the tool, and Figs. 2, 3, 4, and 5 showing the tool in various applications of squaring, leveling and plumbing.

The tool takes the appearance of a carpenter's hand saw in having a thin tapered flat blade A with a handle B very similar to a saw handle secured at the large end of the blade by screws C or otherwise, the blade being notched and extending into the handle as indicated at A'.

The blade may in fact be a saw blade by having teeth formed along its tapered edge as indicated at D, and while this gives additional value to the tool it in no wise detracts from the advantages of the tool as a leveling square.

The blade is preferably graduated in units of length along its leveling edge as indicated at F, and preferably in reverse progression on the other side of the blade. The handle is thicker than the blade, as with a saw handle, and formed with a hand grip opening E extending substantially at right angles to the length of the blade so that the blade may be extended directly away from the user's arm to square, level, plumb, and position the work in the manner indicated in Fig. 4 of the drawings.

The edge of the handle forms a flush extension of the graduated edge of the blade and has a shoulder G on both sides of the blade forming an angle of 90 degrees with the graduated edge.

The extreme end of the blade is cut at right angles to the graduated edge and is preferably of some standard distance of measure, such as two feet, from the shoulder G of the handle, while the handle itself is of a length to extend the rule a definite distance, such as six inches, from the shoulder of the handle, so that the total length of the square equals the blade plus the handle, either end forming the termination of the series of graduations.

Besides the above, the extreme end of the handle is provided with corners to form a right angle (H) with the graduated edge of the blade, and preferably bears graduation numerals along its flush edge as indicated so that certain dimensions may be marked off against the various notches in the edge of the handle formed for better gripping thereof.

Within the outlines of the handle is a triangularly shaped opening K provided with bubble glasses L and M respectively lying parallel with the graduated edge of the blade and at right angles thereto, and in such a manner that the bubbles of the glasses may be observed through the opening from either side of the tool.

The handle is preferably made of hollow light metal construction so that the tool will not become inaccurate through warpage, and is either drilled as at LL, MM, or split as may be desired, for insertion of the glasses, and which are well within the thickness of the handle so as to be protected from injury, and are locked in position when the blade is in place.

Figs. 2, 3, 4, and 5 indicate some of the more common uses of the tool. In Fig. 2 the simultaneous leveling of timber N and plumbing of timber O therefrom preparatory to driving the nail X is indicated. In Fig. 3 the leveling of timber P, squaring and plumbing of timber Q and simultaneous positioning of timber R with relation to Q is shown. In Fig. 4 is shown the simultaneous checking of the plumbing of S, squaring of T and S, positioning of U from T by the graduations F, and the extension of the device in the hand V of a workman indicates the advantages of the particular handle relation to the blade in projecting the tool to a position not easily accessible, while another workman not shown manipulated the perhaps very heavy timber U for securing by the nail Y. In Fig. 5 is shown the simple plumbing of the stud W.

Many other applications of the tool will readily present themselves to the bright mechanic, and but one more need be mentioned here and that is the one through functioning of the angular edge Z of the blade, whether or not the same be provided with teeth.

Structurally this angle to the edge Z gives a wider base to the blade to maintain such a long blade straight and true, and provides means for securing it firmly to the handle while accommodating the two bubble glasses. Functioning however with the other features of the leveling square the angle represents a minimum unit pitch for roof timbers so that the angle may be directly transcribed therefrom to the studding as at RR in Fig. 3 from the level member P, or if desired by contact of the shoulder G with R, and of course any multiple of the unit pitch may easily be obtained by adding the total angle of the blade by transcribing the same therefrom.

In contemplating my improved leveling square as disclosed, it will be seen to provide through its comparatively great length, a very accurate tool, yet on account of its flat tapered blade a tool which is extremely light and rigid, and while it resembles a hand saw and may be combined in one, the instrument shows a complete set of cooperating functions not possessed by a saw or any other tool to equal advantage in so far as I am aware.

Therefore, while I show an instrument of this kind embodying many advantages, it is apparent that some of its good features might be omitted while retaining the others, and I therefore claim these features either separately where I believe them to be new, or in combination where I believe the combination to be new, as follows:—

I claim:

1. A mechanic's tool comprising an elongated thin flat blade tapering in width and provided with a series of graduations of length extending along the side of the blade adjacent a long edge thereof, a gripping handle embracing and secured to the wide end of the blade extending beyond the blade in flush relation with said edge and notched at points continuing said series of graduations beyond the blade and terminating at the end of the series, said blade being notched at its end within the handle and the handle formed with an opening extending transversely through the same and through the notch in the blade, and a pair of bubble glasses mounted at right angles to one another within said opening in the handle and lying within said notch in said blade.

2. A mechanic's tool comprising a handsaw blade, a handle slotted to receive the blade and secured to one end of the same, said blade being formed with a rectangular notch on the end within the handle and the handle formed with a transversely extending opening passing through the notch, and a pair of bubble glasses fixedly arranged within said notch and opening, one of said glasses aligned with the back edge of said blade and one side of the notch and the other extending at right angles thereto adjacent the right angle extension of the notch.

WILLIAM MIDGLEY.